United States Patent [19]

Hunter et al.

[11] 3,888,801

[45] June 10, 1975

[54] GAS-EXPANDING POLYMERS USING HYDRAZODICARBOXYLATES

[75] Inventors: Byron A. Hunter, Woodbridge; Franklin H. Barrows, Beacon Falls, both of Conn.

[73] Assignee: Uniroyal, Inc., New York, N.Y.

[22] Filed: Apr. 1, 1974

[21] Appl. No.: 457,036

Related U.S. Application Data

[63] Continuation-in-part of Ser. No. 354,818, April 26, 1973, abandoned.

[52] U.S. Cl.......... 260/2.5 R; 260/2.5 N; 260/2.5 H; 260/2.5 HB; 260/2.5 HA; 260/40 R; 260/479 S; 260/482 P
[51] Int. Cl. ............................................. C08j 1/20
[58] Field of Search................. 260/2.5 R, 2.5 HB

[56] References Cited
UNITED STATES PATENTS

| | | | |
|---|---|---|---|
| 3,111,496 | 11/1963 | Hunter | 260/2.5 HB |
| 3,306,862 | 2/1967 | Mageli et al. | 260/2.5 HB |

*Primary Examiner*—Morton Foelak
*Attorney, Agent, or Firm*—Robert J. Patterson, Esq.

[57] ABSTRACT

Disclosed is the gas expansion or blowing of gas-expandable polymers with a particular class of dihydrocarbyl hydrazodicarboxylates, namely those wherein at least one of the two hydrocarbyl groups is a secondary or tertiary $C_3$ to $C_5$ alkyl group, especially isopropyl, secondary butyl, or tertiary butyl, while the other hydrocarbyl group is a primary, secondary or tertiary straight-chain or branched-chain alkyl group having from 1 to 8 carbon atoms, a cycloalkyl radical having from 5 to 8 carbon atoms, an aryl radical having from 6 to 10 carbon atoms, or an alkaryl or aralkyl radical having from 7 to 10 carbon atoms, and preferably is a $C_1$ to $C_4$ alkyl group. Of the di $C_1$ to $C_4$ alkyl hydrazodicarboxylates, those wherein both alkyl groups are secondary or tertiary such as diisopropyl, isopropyl secondary butyl, di-secondary butyl, and tertiary butyl hydrazodicarboxylates evolve the greatest volumes of gas upon decomposition and are therefore deemed to be the most effective for use in practicing the invention.

22 Claims, No Drawings

GAS-EXPANDING POLYMERS USING HYDRAZODICARBOXYLATES

CROSS-REFERENCE TO RELATED APPLICATION

This application is a continuation-in-part of copending application Ser. No. 354,818 filed Apr. 26, 1973, now abandoned.

BACKGROUND OF THE INVENTION

1. Field of the Invention

This invention relates to the production of gas-expanded polymeric materials with certain dihydrocarbyl hydrazodicarboxylates.

2. Description of the Prior Art

Blowing agents which decompose at relatively high temperatures are not new. U.S. Pat. No. 3,235,519 issued Feb. 15, 1966 in the name of Hunter discloses using sulfonyl semicarbazides as blowing agents for polymeric materials which soften above 170°C. These blowing agents are particularly suitable for expanding high density polyethylenes, and many other rubbery and plastic polymers.

The use of hydrazodicarboxylates as blowing agents in polyamide-type polymers is known from U.S. Pat. No. 3,554,937 issued Jan. 12, 1971 in the name of Cadus, et al. While this patent refers to aliphatic and araliphatic hydrazodicarboxylic esters the only specific esters disclosed are those of methyl alcohol and ethyl alcohol, and the patent does not teach or suggest the use of the novel blowing agents of the present invention.

SUMMARY OF THE INVENTION

The invention involves blowing gas-expandable polymeric material with a particular class of dihydrocarbyl hydrazodicarboxylates which have been found to evolve upon thermal decomposition far greater volumes of gas than the dimethyl and diethyl hydrazodicarboxylates disclosed in Cadus et al.

The hydrazodicarboxylates employed in the present invention have the formula:

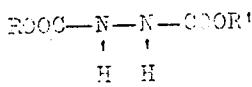

wherein at least one of R and R' is selected from the group consisting of secondary and tertiary alkyl groups having from 3 to 5 carbon atoms and the other of R and R' is selected from the group consisting of primary, secondary and tertiary straight-chain or branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms. Preference is given to those dihydrocarbyl hydrazodicarboxylates wherein at least one of R and R' is selected from the group consisting of isopropyl, secondary butyl and tertiary butyl and the other of R and R' is selected from the group consisting of $C_1$ to $C_4$ alkyl groups.

Most preferred are those hydrazodicarboxylates wherein both R and R' are selected from the group consisting of isopropyl secondary butyl and tertiary butyl.

The aforementioned patent of Cadus, et al, states (column 1, lines 50–52), "Hydrazodicarboxylic esters of alkanols such as methyl alcohol and ethyl alcohol are particularly suitable." To one skilled in the art the implication of this statement would be that higher alkyl radicals than ethyl such as propyl, butyl, etc. would be less suitable. Indeed, one skilled in the art might well assume that as the molecular weight of the hydrazodicarboxylate molecule increases the amount of gas evolved upon decomposition per unit weight of the compound would decrease. The amount of gas so evolved is a direct indiccation of the effectiveness of the hydrazodicarboxylate as a chemical blowing agent.

The present invention is based upon the surprising and unexpected discovery that, contrary to what those skilled in the art might have expected from the teachings of U.S. Pat. No. 3,554,937 with respect to dimethyl and diethyl hydrazodicarboxylates or from actual experience with those compounds, the volume of gas evolved is much greater when the hydrazodicarboxylate contains one or two secondary or tertiary alkyl groups. This is demonstrated by the following tabular data:

| Dialkyl Hydrazodicarboxylate | Gas Evolved cc/g (STP) |
| --- | --- |
| Dimethyl | 147 |
| Diethyl | 137 |
| Di-n-propyl | 137 |
| Di-n-butyl | 128 |
| Diisobutyl | 137 |
| Diisopropyl | 221 |
| Di-secondary butyl | 196 |
| Methyl isopropyl | 194 |
| Ethyl isopropyl | 190 |
| Methyl secondary butyl | 176 |
| Ethyl secondary butyl | 178 |
| Isopropyl secondary butyl | 210 |
| Di-tertiary butyl | 216 |

The above data surprisingly show that of the thirteen $C_1$ to $C_4$ dialkyl hydrazodicarboxylates tested diisopropyl hydrazodicarboxylate and di-tertiary butyl hydrazodicarboxylate evolve the greatest volume of gas, while the mixed isopropyl secondary butyl hydrazodicarboxylate generates nearly as much. Thus these three compounds are most highly preferred in the practice of the present invention. The above data further strikingly show the marked superiority of the last eight dialkyl hydrazodicarboxylates wherein at least one of the alkyl groups is secondary or tertiary, e.g., isopropyl, secondary butyl, or tertiary butyl, and the other alkyl group is either isopropyl, secondary butyl, tertiary butyl, methyl or ethyl. For example, the di-secondary butyl compound, although not as good as the diisopropyl compound or the isopropyl secondary butyl compound or the di-tertiary butyl compound, nevertheless is unexpectedly far superior to the isomeric diisobutyl and the di-n-butyl hydrazodicarboxylates. The data also clearly show that when one of the secondary alkyl groups in the diisopropyl or di-secondary butyl hydrazodicarboxylates is replaced by methyl or ethyl the volume of gas evolved is reduced, yet, it is still significantly above those of compounds not containing any secondary or tertiary alkyl groups.

The blowing agents used in the practice of the invention begin to decompose non-explosively, and controllably, at temperatures not lower than 200°C, and preferably not lower than 225°C, but have high heat stability at temperatures below 200°C so that they can be uniformly incorporated with the polymeric material to be expanded at moderately elevated temperatures without decomposition.

The terms "polymeric material" and "polymer" as used herein mean homopolymers, interpolymers, graft polymers, and mixtures and blends of two or more of these, and include thermoplastic, thermosetting and rubbery polymers. In particular, the blowing agents of the present invention are useful for expanding polymers that have high processing temperatures such as the polycarbonates, phenylene oxidebased resins, polyarylsulfones, the various nylons, polyesters, certain polystyrenes, polypropylene, poly(styreneacrylonitrile), polyacetals, urethane elastomers, polyvinyl polymers, polyphenylene sulfide, polymethylpentene, certain polyethylenes, polyimides, polyaryl ethers, ABS polymers, polyacrylics, cellulosic polymers, halogenated polymers, especially the fluoroplastics, poly-(ethylene-vinyl acetate), and polymer alloys.

Upon decomposition, the hydrazodicarboxylates used in the practice of the invention produce primarily olefins, carbon dioxide, carbon monoxide, alcohols and smaller amounts of nitrogen.

Generally, the amount of blowing agent used will depend on the nature of the polymer to be expanded, and the desired density of the foam to be produced. Usually, 0.05 to 15, and, most often, 0.1 to 5.0 parts of blowing agent are employed, based on 100 parts of the polymer by weight. The blowing agents can be used alone or in combination with other blowing agents. Activating substances can be used to increase the gas-releasing efficiency, or to lower the normal decompositin temperature, of the blowing agents of the invention. Other additives such as plasticizers, fillers, nucleating agents, and the like can also be added to the polymeric material to be expanded.

DESCRIPTION OF THE PREFERRED EMBODIMENTS

The following examples illustrate the preparation of some of the hydrazodicarboxylates which can be used in the practice of the invention, and their use as blowing agents for producing expanded polymeric materials.

EXAMPLE I

Preparation of Diisopropyl Hydrazodicarboxylate

A 2-liter reaction flask was charged with 294 g (1.0 mole) of 17% hydrazine hydrate solution, 200 ml water, and 106 g (1.0 mole) of sodium carbonate. The temperature was adjusted to 80°C. and 245 g (2.0 moles) of isopropyl chloroformate was added over a period of 1 hour while the temperature was maintained in the range 80° to 100°C. After the addition was complete, the mixture was heated to reflux for 30 minutes. After cooling to 30°C., a white precipitate formed, was filtered, washed with water and dried. The product weighed 187 g. (91.7% yield), melted at 105°–107°C, and began to decompose at 244°C to produce blowing gas. Dumas analysis gave 13.40% nitrogen; the theoretical value is 13.7%.

EXAMPLE II

Preparation of Ethyl Isopropyl Hydrazodicarboxylate

A 1-liter reaction flask was charged with 53 g (0.5 mole) of sodium carbonate, 250 ml ethanol, and 122.5 g (1.0 mole) of ethyl carbazate. The ethyl carbazate had been prepared by heating an equimolar mixture of anhydrous hydrazine with diethyl carbonate, and distilling off the ethanol. Over a period of one hour, 122.5 g (1.0 mole) of isopropyl chloroformate was added dropwise while the temperature was maintained below 45°C. The mixture was stirred an additional hour, heated to 70°C, then filtered rapidly from the separated sodium chloride crystals. The oily residue was treated with hexane whereupon a crystalline product formed. Filtration of this product left 165 g of crystalline solid melting at 70°–75°C. A recrystallized portion from a mixture of benzene and hexane (20:80 weight ratio) melted at 68°–71°C. Dumas analysis gave 14.72% nitrogen; the calculated value is 14.74%.

EXAMPLE III

Preparation of Di-Secondary Butyl Hydrazodicarboxylate

A 1-liter reaction flask was charged with 294 g (1.0 mole) of 17% hydrazine hydrate solution, and 106 g (1.0 mole) of sodium carbonate. Then 300.6 g (2.0 moles) of secondary-butyl chloroformate was added dropwise over a period of 60 minutes, while the temperature was held below 65°C. After addition was complete, the mixture was stirred an additional two hours at 60°C. Then the temperature was increased to reflux (near 100°C) for one hour. The hot mixture was poured into a separatory funnel, and cooled to 70°C. The lower aqueous mixture was sperated, and the upper oily layer cooled and a product crystallized. The crystalline product weighed 235 grams, and melted at 68°–76°C. Upon recrystallization from hexane, this product weighed 224 g, melted at 87°–89°C, and began to decompose at 217°C. Dumas analysis gave 12.07% nitrogen; the calculated value is also 12.07%.

EXAMPLE IV (COMPARATIVE)

Expansion of Polysulfone Resin with Hydrazodicarboxylates

Polysulfone resin pellets, which had been pre-dried overnight in a 250°F oven, were commingled with dimethyl hydrazodicarboxylate and with two different levels of di-secondary butyl hydrazodicarboxylate by placing the materials in plastic bags and tumbling them for 10 minutes. The resulting mixtures were then sequentially placed in the hopper of a small laboratory extruder the several zones of which were maintained at the temperatures shown in Table I below and extruded in expanded form. The densities of the three expandedd extrudates are shown in Table I. Previous determinations had shown that the density of the unexpanded resin was 1.2299.

The reduction in density at the 1 part level of dimethyl compound was 45% while at the same level of the di-secondary butyl compound it was 55%. When the amount of the di-secondary butyl compound was increased to the 1.5 pph level the reduction in density achieved was 66%.

TABLE I

| Blowing Agent | Blowing Agent, pph* | Temperature °F. Rear | Front | Die | Screw Speed RPM | Stock Temp. | Density | % Density Reduction |
|---|---|---|---|---|---|---|---|---|
| Dimethyl hydrazodicarboxylate | 1.0 | 540 | 580 | 530 | 30 | 560 | .6635 | 46 |
| Di-secondary-butyl hydrazodicarboxylate | 1.0 | 540 | 580 | 530 | 30 | 560 | .5555 | 55 |
| Di-secondary-butyl hydrazodicarboxylate | 1.5 | 540 | 580 | 530 | 30 | 560 | .4242 | 65 |

*parts per hundred of resin

TABLE II

Expansion of Polysulfone Resin with Hydrazodicarboxylates
(Polysulfone P-1700 Resin)

| Blowing Agent | % Blowing Agent by Weight | % Additive (Nucleating Agent) by Weight | Temperature °C. Rear | Front | Die | Screw speed (RPM) | Density | % Density Reduction |
|---|---|---|---|---|---|---|---|---|
| None | 0.0 | 0.0 | | | | | 1.2299 | |
| Diisopropyl hydrazodicarboxylate | 0.5 | — | 304 | 304 | 271 | 100 | 0.59300 | 52 |
| Diisopropyl hydrazodicarboxylate | 0.5 | 0.5% "celite" (trademark) brand of diatomacious earth | 304 | 304 | 271 | 100 | 0.45305 | 63 |
| Di-n-propyl hydrazodicarboxylate | 0.85 | — | 304 | 316 | 293 | 100 | 0.79613 | 35 |
| Di-n-propyl hydrazodicarboxylate | 0.85 | 0.85% "Micro-cel" (trademark) brand of synthetic hydrous calcium silicate | 288 | 310 | 271 | 60 | 0.67267 | 45 |

EXAMPLE V (COMPARATIVE)

Expansion of Polysulfone Resin With Diisopropyl Hydrazodicarboxylate and Di-n-Propyl Hydrazodicarboxylate Two batches of polysulfone P-1700 resin pellets were tumble-blended with diisopropyl hydrazodicarboxylate and di-n-propyl hydrazodicarboxylate, respectively, and the coaated pellets were fed into the extruder described in example IV. Two additional quantities of P-1700 pellets were tumble blended with the same blowing agents, and with certain nucleating agents, and these pellets were also extruded from the extruder of example IV. Table II shows the amounts of blowing agents and nucleating agents added to the resin, and the density of the extruded, expanded plastic. The data indicate that the diisopropyl compound was considerably superior to the di-n-propyl compound in blowing effectiveness, and that this superiority was achieved both in the absence and in the presence of a nucleating agent.

EXAMPLE VI

Expansion of Poly(Chlorotrifluoroethylene) Resin

Pellets of poly(chlorotrifluoroethylene) resin, sold under the trademark Halar 200 by Dupont Corp., were tumble-blended with 1 part by weight of diisopropyl hydrazodicarboxylate, based on 100 parts by weight of the pellets. The coated pellets were extruded from a Davis-Standard extruder (Model 15T, 1.5-inch diameters, L/D of 241.)equipped with screens of 20, 40 and 60 mesh, respectively, and a 1 and ¼ inch strip die. The extruder was operated with five zones of different temperature: in the first zone at the rear, the temperature was 249°C; in the next zone, 254°C; in the third zone, 271°C; in the fourth zone, 282°C; and, at the die head, 249°C. The extruded, expanded polymer stock had a temperature of 263°C at the die head. The screw speed was 20 rpm. The density of the extruded polymer stock was 0.72 g/cc, a 58% reduction in density from the unextruded, unexpanded density of 1.67 g/cc.

EXAMPLE VII

Expansion of ABS Polymer

ABS polymer, containing 12.6 % butadiene, 1.4% styrene, 25.8% acrylonitrile, and 60.2% alpha-methyl styrene, (all percentages by weight) was tumble-blended with 0.7 part of diisopropyl hydrazodicarboxylate per 100 parts of polymer, and fed into the extruder of example IV in which the rear temperature was 238°C; the front temperature, 277°C; the die head temperature, 238°C; the screw speed was 25 rpm. The extruded, expanded polymer stock had a temperature of 238°C, and a density of 0.55 g/cc, a 47.6% reduction from the unexpanded, unextruded density of 1.05 g/cc.

EXAMPLE VIII

Expansion of Glass-Reinforced Polyester Resin

Glass-reinforced polyester resin, sold under the trademark Celenex 3300 by Celanese Corporation, was tumble-blended with 0.8 part of diisopropyl hydrazodicarboxylate per hundred parts of polymer, and extruded from the extruder described in Example IV. The rear temperature of the extruder was 254°C; the front temperature, 271°C; the die head temperature, 227°C; and the extruded stock temperature, 238°C. The screw speed was 50 rpm. The expanded extrudate had a density of 0.94 g/cc, a 35% reduction in density from the unexpanded, unextruded density of 1.44 g/cc.

EXAMPLE IX

Expansion of Non-reinforced Polyester Resin

Pellets of non-reinforced polyester resin, available under the trademark Celenex J-123 from Celanese Corporation, were tumble-blended with 0.8 part by weight of diisopropyl hydrazodicarboxylate per 100 parts of resin, and the coated pellets were extruded from the extruder described in Example IV. The rear temperature of the extruder was 271°C; the front temperature, 276°C; the die head temperature, 227°C; and the screw speed was 50 rpm. The stock emerging from the extruder had a temperature of 238°C, and the expanded extrudate had a density of 0.93 g/cc, a 28.6% reduction from the unexpanded, unextruded density of 1.32 g/cc.

EXAMPLE X

Expansion of Polysulfone With Diisopropyl Hydrazodicarboxylate

Polysulfone pellets, coded P-1700 by Union Carbide Company, were dried overnight, then tumble-mixed with 1% by weight of diisopropyl hydrazodicarboxylate. These coated pellets were fed into a standard 5-ounce reciprocating-screws, injection molding machine operating with a rear temperature of 266°C; a center temperature of 304°C; a front temperature of 310°C; and a mold temperature of 70°C. Injection pressure was 4000 pounds per square inch (psi). A foamed bar made in this manner and having dimensions of 5 by 0.5 by 0.25 inches weighed 8.15 g; a bar of the same dimensions made by the same method from unfoamed polysulfone pellets weighed 12.7 g. The blowing agent had reduced the density by 36%.

EXAMPLE XI

Expansion of Polycarbonate With Diisopropyl Hydrazodicarboxylate

Diisopropyl hydrazodicarboxylate was tumble-mixed with dried polycarbonate pellets coded Lexan 101 (trademark) and made by General Electric Company, in amounts of 2 parts to 100 parts, respectively. These pellets were injection molded on a 3-ounce Van Dorn reciprocating screw machine to form a foamed plaque measuring 4⅝ by 2⅝ by ¼ inches, and having a density of 0.8 g/cc. The density of an unfoamed plaque made from polycarbonate was 1.2 g/cc.

EXAMPLE XIII (COMPARATIVE)

Expansion of Polycarbonate With p-Toluene Sulfonyl Semicarbazide and with Diisopropyl Hydrazodicarboxylate Two portions of dried polycarbonate pellets (Lexan 101) were coated with blowing agents, the first with 1% by weight diisopropyl hydrazodicarboxylate, and the second with 1% by weight of p-toluene sulfonyl semicarbazide. Each portion of coated pellets was extruded from the extruder described in example IV. The extruder had three temperature zones of 282°, 293° and 282°C, respectively, and the stock temperature was 280°C at the die head. At these high processing temperatures, the semicarbazide-blown plastic was stongly discolored; the hydrazodicarobxy-late-blown plastic retained its original color.

Moreover, as determined by relative viscosity measurements, the pellets blown with the diisopropyl hydrazodicarboxylate suffered far less degradation than the semi carbazide-blown pellets. In this test, each of the foregoing extrudates, and a third, unfoamed polycarbonate extrudate, were chopped into small pieces, and 0.5 g of each were dissolved in methylene chloride. Using a Cannon Ubbelohde viscometer, the efflux time for the solvent alone, and for each dissolved extrudate, was measured, and the relative viscosity was calculated by dividing the efflux time for each solution by the efflux time for the pure solvent. Unfoamed polycarbonate had a relative viscosity of 1.311; diisopropyl hydrazodicarboxylate-blown polycarbonate, 1.273; and semi-carbazide-blown polycarbonate, 1.185. These data are directly proportional to intrinsic viscosity, which is, in turn, directly proportional to molecular weight. A decrease in molecular weight implies a directly proportional decrease in physical properties, and the data obtained established that the diisopropyl hydrazodicarboxylate blowing agent of the invention produce a much smaller loss of these properties than the known semicarbazide.

EXAMPLE XIII

Expansion of Polycarbonate (Comparative)

This experiment demonstrates the superior impact strength of polycarbonate when expanded with a compound of the invention instead of p-toluene sulfonyl semicarbazide. For that purpose 100 pts of polycarbonate (Lexan 101) was dried for 8 hrs. at 250°F, then tumbled blended at room temperature with 0.5 pts. of the blowing agents listed below. Appropriate amounts of the blends were injection molded with a reciprocating injectin molding machine resulting in 5 inches × 8 inches × 0.5 inches size samples of substantially the same weight (195g) (a non-blown sample weighed 354g). The expanded samples were subjected to the Gardner Drop Weight Impact test (½ foot ball) which is capable of measuring impact values up to 160 in. lb. The results are summarized in Table III below.

TABLE III

| Blowing Agent | Impact Strength |
|---|---|
|  | in. lb. |
| p-toluene sulfonyl semicarbazide | 40 |
| di-secondary-butyl hydrazodicarboxylate | 100 |

The above data show the unexpected superiority (so far as degradation as indicated by impact strength is concerned) of the Di-sec.-butyl hydrazodicarboxylate blowing agent of the present invention over the compound (p-toluene sulfonyl semicarbazide) well known to the art when used in polycarbonate polymer.

EXAMPLE XIV

Expansion of Polycarbonate (Comparative)

This experiment exemplifies the minimum effect a compound of the invention has on the molecular weight of polycarbonates compared to the high temperature blowing agent, 5-phenyltetrazole, which has been and is widely used for blowing polycarbonates. To that end, Lexan FL 900 glass-filled (5% by weight) polycarbonate pellets of General Electric Company were dried in the usual manner and then tumble blended first with 0.3 pts. of mineral oil per hundred parts of polymer, and secondly with 1 pph of the two blowing agents (see Table II). The polycarbonate blends were dried (4 hrs. at 120°C) and samples having dimensions of 5 inches × 5 inches × ⅛ inches were prepared by injection molding. The stock temperature in the injection molding machine was controlled in such a fashion as to result in a 40% reduction in sample weight at a constant 1 part level of blowing agent (per 100 parts of polycarbonate). The intrinsic viscosities (I.V.) of the expanded polymer samples were determined and the viscosity average molecular weights ($\overline{M}_{r}$) calculated using the equation $$\overline{M}_r = \sqrt[a]{\frac{I.V.}{K}}$$

wherein $K = 5.54 \times 10^{-4}$, $a = 0.67$ for I.V. in dioxan at 30°C (see W. F. Christopher, et al. "Polycarbonates" Reinhold (1962)).

TABLE IV

| Blowing Agent | Stock Temp. °F | I.V. dl/g | $\overline{M}_r$ | % Reduction of $\overline{M}_r$ |
|---|---|---|---|---|
| None | 600 | 0.46 | 24,000 | — |
| di-isopropyl hydrazodicarboxylate | 545 | 0.41 | 20,000 | 17 |
| 5-phenyltetrazole* | 540 | 0.31 | 13,000 | 46 |

*Outside the invention

From the data in Table IV it will be seen % molecular weight reduction caused by 5-phenyltetrazole is more than twice as large as that caused by the diisopropyl hydrazodicarboxylate of the invention.

We claim:

1. A composition comprising a gas-expandable polymeric material and a compound having a formula:

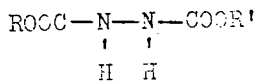

wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms.

2. A composition comprising a gas-expandable polymeric material and a compound having the formula:

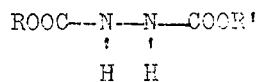

wherein at least one of R and R' is selected from the group consisting of isopropyl, secondary butyl and tertiary butyl and the other of R and R' is selected from the group consisting of $C_1$ to $C_4$ alkyl groups.

3. A composition comprising a gas-expanded polymeric material and a compound having the formula:

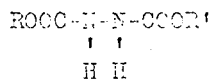

wherein both R and R' are selected from the group consisting of isopropyl, secondary butyl and tertiary butyl.

4. A composition according to claim 2 wherein said compound is diisopropyl hydrazodicarboxylate.

5. A composition according to claim 2 wherein said compound is di-secondary butyl hydrazodicarboxylate.

6. A composition according to claim 2 wherein said compound is methyl isopropyl hydrazodicarboxylate.

7. A composition according to claim 2 wherein said compound is ethyl isopropyl hydrazodicarboxylate.

8. A composition according to claim 2 wherein said compound is methyl secondary butyl hydrazodicarboxylate.

9. A composition according to claim 2 wherein said compound is ethyl secondary butyl hydrazodicarboxylate.

10. A composition according to claim 2 wherein said compound is isopropyl secondary butyl hydrazodicarboxylate.

11. A composition according to claim 2 wherein said compound is di-teritiary butyl hydrazodicarboxylate.

12. A process for expanding a gas-expandable polymeric material comprising incorporating with said polymeric material a compound having the formula:

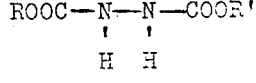

wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms, and heating the resulting mixture to a temperature above the decomposition temperature of said compound to cause it to liberate gas and thereby expand said polymeric material.

13. A process for expanding a gas-expandable polymeric material comprising incorporating with said polymeric material a compound having the formula:

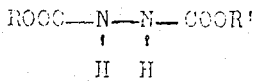

wherein at least one of R and R' is selected from the group consisting of isopropyl, secondary butyl and tertiary butyl and the other of R and R' is selected from the group consisting of $C_1$ to $C_4$ alkyl groups and heating the resulting mixture to a temperature above the decomposition temperature of said compound to cause it to liberate gas and thereby expand said polymeric material.

14. A process for expanding a gas-expandable polymeric material comprising incorporating with said polymeric material a compound having the formula:

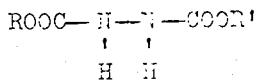

wherein both R and R' are selected from the group consisting of isopropyl, secondary butyl and tertiary butyl and heating the resulting mixture to a temperature above the decomposition temperature of said compound to cause it to liberate gas and thereby expand said polymeric material.

15. A process according to claim 13 wherein said compound is diisopropyl hydrazodicarboxylate.

16. A process according to claim 13 wherein said compound is di-secondary butyl hydrazodicarboxylate.

17. A process according to claim 13 wherein said compound dis methyl isopropyl hydrazodicarboxylate.

18. A process according to claim 13 wherein said compound is ethyl isopropyl hydrazodicarboxylate.

19. A process according to claim 13 wherein said compound is methyl secondary butyl hydrazodicarboxylate.

20. A process according to claim 13 wherein said compound is ethyl secondary butyl hydrazodicarboxylate.

21. A process according to claim 13 wherein said compound is isopropyl secondary butyl hydrazodicarboxylate.

22. A process according to claim 13 wherein said compound is di-tertiary butyl hydrazodicarboxylate.

* * * * *